United States Patent
Reinert (10) Patent No.: US 9,112,191 B2
(45) Date of Patent: Aug. 18, 2015

(54) INTERCONNECTOR ARRANGEMENT FOR A FUEL CELL STACK

(75) Inventor: Andreas Reinert, Witten (DE)

(73) Assignee: SunFire GmbH, Dresden (DE)

( * ) Notice: Subject to any disclaimer, the term of this patent is extended or adjusted under 35 U.S.C. 154(b) by 802 days.

(21) Appl. No.: 13/142,018

(22) PCT Filed: Jan. 13, 2010

(86) PCT No.: PCT/DE2010/000025
§ 371 (c)(1),
(2), (4) Date: Jun. 24, 2011

(87) PCT Pub. No.: WO2010/085933
PCT Pub. Date: Aug. 5, 2010

(65) Prior Publication Data
US 2011/0275002 A1    Nov. 10, 2011

(30) Foreign Application Priority Data
Feb. 2, 2009   (DE) .......................... 10 2009 006 925

(51) Int. Cl.
*H01M 8/02*        (2006.01)
*H01M 8/12*        (2006.01)

(52) U.S. Cl.
CPC .......... *H01M 8/0232* (2013.01); *H01M 8/0241* (2013.01); *H01M 8/0254* (2013.01); *H01M 2008/1293* (2013.01); *Y02E 60/50* (2013.01); *Y02E 60/525* (2013.01)

(58) Field of Classification Search
CPC   H01M 8/0232; H01M 8/0241; H01M 8/0282
USPC .................................................. 429/468, 508
See application file for complete search history.

(56) References Cited

U.S. PATENT DOCUMENTS

| | | | |
|---|---|---|---|
| 2004/0151969 A1* | 8/2004 | Ian Joos et al. | 429/35 |
| 2005/0100774 A1 | 5/2005 | Abd Elhamid et al. | |
| 2007/0231619 A1 | 10/2007 | Strobel | |
| 2010/0129733 A1* | 5/2010 | Reinert | 429/517 |

FOREIGN PATENT DOCUMENTS

| | | |
|---|---|---|
| DE | 102007024227 A1 | 11/2008 |
| DE | 692 17 132 | 12/2008 |
| DE | 102007034967 A1 | 1/2009 |

(Continued)

OTHER PUBLICATIONS

International Search Report dated Apr. 26, 2010.

*Primary Examiner* — Ula C Ruddock
*Assistant Examiner* — Frank Chernow
(74) *Attorney, Agent, or Firm* — Patent Central LLC; Stephan A. Pendorf (57) ABSTRACT

The invention relates to an interconnector arrangement for a fuel cell stack, which can be brought into electrical contact with at least one membrane electrode assembly and which is arranged to separate a cathode flow field of the fuel cell stack from an anode flow field of the fuel cell stack. The invention is characterized in that the interconnector arrangement comprises a hollow space separated from the anode flow field and from the cathode flow field such that a flow of gas through the hollow space may not be more than five percent of flow-off gas through the cathode flow field or the anode flow field. The invention also relates to a fuel cell stack and to a method for manufacturing an interconnector arrangement.

11 Claims, 6 Drawing Sheets

(56) References Cited

FOREIGN PATENT DOCUMENTS

| | | |
|---|---|---|
| EP | 1981108 A1 | 10/2008 |
| GB | 2434691 A | 8/2007 |
| JP | 62-256381 A | 11/1987 |
| JP | 63-53858 A | 3/1988 |
| JP | 2-121265 A | 5/1990 |
| JP | 3-74057 A | 3/1991 |
| JP | 5-190187 A | 7/1993 |
| JP | 6-163063 A | 6/1994 |
| JP | 2573721 B2 | 10/1996 |
| JP | 2006-504872 A | 2/2006 |
| JP | 2010-524159 A | 7/2010 |
| WO | WO2008/119328 A1 | 10/2008 |

* cited by examiner

FIG. 1

State of the art

INTERCONNECTOR ARRANGEMENT FOR A FUEL CELL STACK

CROSS-REFERENCE TO RELATED APPLICATIONS

This Application is a U.S. national phase application filed under 35 U.S.C. §371 of International Application No. PCT/DE2010/000025, filed Jan. 13, 2010, designating the United States, which claims priority from German Patent Application No. DE 10 2009 006 925.9, filed Feb. 2, 2009, which are hereby incorporated herein by reference in their entirety for all purposes.

The invention relates to an interconnector arrangement for a fuel cell stack, which can be brought into electrical connection with at least one membrane electrode assembly of the fuel cell stack and which is arranged to separate a cathode flow field of the fuel cell stack and an anode flow field of the fuel cell stack from each other.

Additionally, the invention relates to a fuel cell stack comprising an interconnector arrangement of the mentioned type.

The invention further relates to a method for manufacturing an interconnector arrangement.

Conventionally, several individual fuel cells respectively membrane electrode assemblies are combined to a so-called fuel cell rack respectively fuel cell stack to achieve a larger electrical power than an individual fuel cell can provide on its own. In this, adjacent fuel cells of the fuel cell stack are respectively coupled electrically as well as mechanically to each other via connecting interconnector arrangements. Due to this coupling of the individual fuel cells via the interconnector arrangements, there are thus created fuel cells stacked on top of each other and electrically connected in series, which together form the fuel cell stack. Commonly, there are formed gas distributor structures in the interconnector arrangements of prior art, via which supply gases are guided to the respective membrane electrode assembly. These gas distributor structures for example can be formed partly by a housing part of the interconnector arrangement. For this purpose there are usually provided recesses respectively bulges running like channels in the housing part of the interconnector arrangement, which form a channel wall portion of gas channels. The further channel wall portion then is formed in the mounted state of the interconnector arrangement in the fuel cell stack for example partly by a membrane electrode assembly, in particular by an anode or cathode of an adjacent membrane electrode assembly, such that a gas channel formed from both channel wall portions is created below and above the housing part. The supply gases for each membrane electrode assembly are distributed, via manifolds, into corresponding electrode spaces.

Commonly, the fuel cell stacks are mainly made from ferritic materials. These ferritic materials show a low mechanical stability at high temperatures, which can make itself known in deformations via flowing or creepage. This is the case in particular if a hollow space is formed by a structure pressed from thin-walled sheet metal as is the case in the above-mentioned gas distributor structures having the gas channels. To avoid such deformations, there are often used spacers respectively distance pieces in the corresponding hollow space, which are provided between the housing parts of an interconnector arrangement and a membrane electrode assembly and thus contribute to the stabilization of the fuel cell stack. Embodiments of interconnector arrangements already known are for example provided with frames extending also around the fuel cell stack in its edge region, in particular by annular structures in the region of the manifolds which are at least partly obtained directly from the sheet metal of one or both housing parts of the interconnector arrangement. In a fuel cell stack under tension a force flow is then mainly guided through these regions, i.e. for example through the annular structure in the edge region. Such force flow guidance respectively force transmission mainly occurring through the frame in the edge region and to a lesser degree through the center region of the manifolds of the fuel cell stack, however, leads to several significant disadvantages. For example, the force flow goes through sealing material, which is arranged in grooves between individual fuel cells and interconnector arrangements, respectively, and in most cases is formed from glass ceramics. Glass ceramics however tends to creepage and flowing, in particular at higher temperatures occurring during operation of the fuel cell stack. With corresponding strain on the seals, the tension of the fuel cell stack is strongly reduced over time due to this creepage behavior. Although the usage of distance pieces leads to a stabilization of the individual interconnector arrangements, the stability of the fuel cell stack as a whole however is still strongly reduced due to the creepage behavior of the seals. To avoid creepage of the seals as far as possible, according to prior art usage of so-called hybrid seals is suggested, which constitute of a mechanically stable ceramics or metal body and glass. Furthermore, at temperatures above 850° C., as they appear in particular in connection with operation of SOFC fuel cell stacks, there are little possibilities for using elastic parts. Therefore the seals at the edge region of the fuel cell stack and the electrical contacting of the fuel cell stack (active area) arranged further to the interior are always in competition with the seals at the edge via the interconnector arrangement. As it is difficult to form an adhesive bond between a cathode of a membrane electrode assembly and a housing part, in particular a sheet metal part, of the interconnector arrangement, there is a dependency of the force flow acting in the active area. In the case of a fuel cell supported in the edge region and in the manifold by the use of massive materials, for example by distance pieces or spacers, creepage of the materials in the active region of the fuel cell stack can lead to loss of the electrical contact between the fuel cells and thus to degradation of the total system.

International patent application publication number WO 2008/119328 A1 therefore proposes that the interconnector arrangement comprises a nickel foam interposed between at least one housing part of the interconnector arrangement and the membrane electrode assembly to establish an electrically conductive connection. The nickel foam may notably be in contact with an anode of the membrane electrode assembly. With this there is obtained a homogeneous nickel surface on the side of the interconnector arrangement facing the anode, which can ideally bond to the nickel of the anode.

Figure 1:
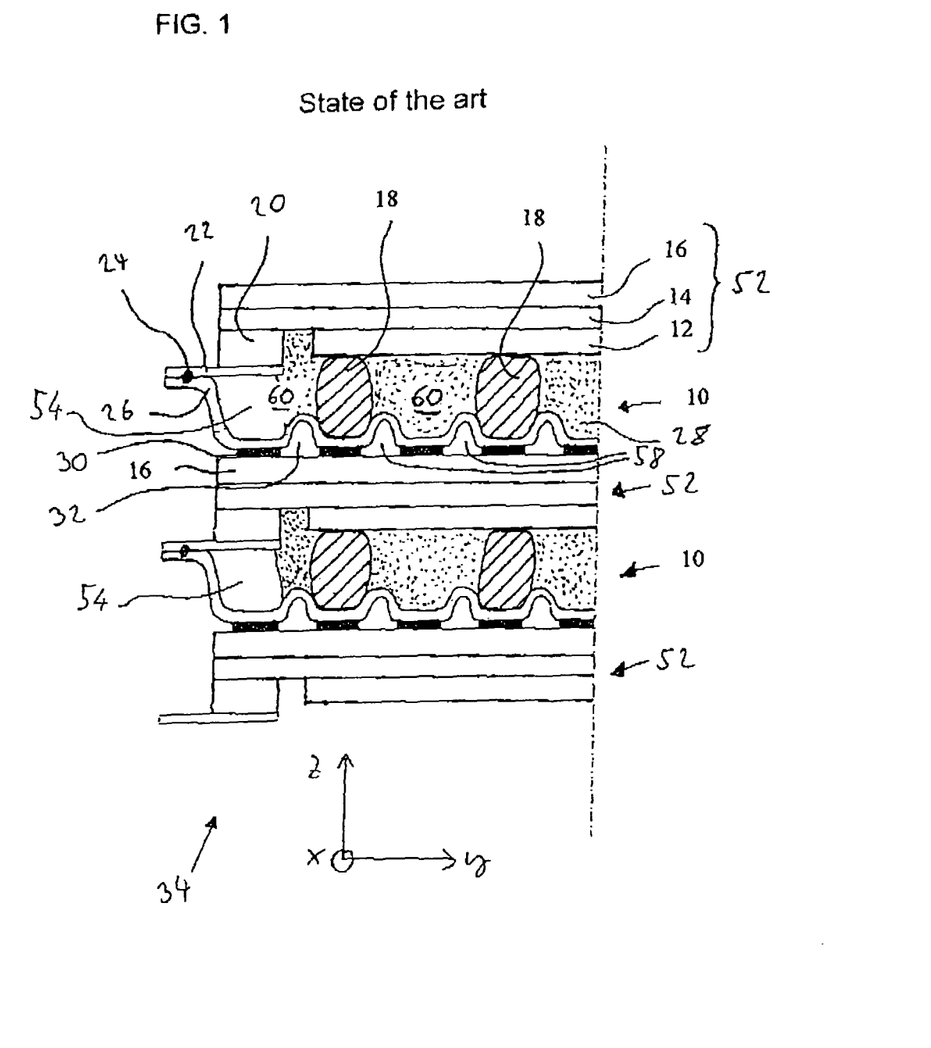
FIG. 1 shows a schematic cross section through a generic fuel cell stack.

FIG. 1 schematically shows a cross section of a generic interconnector arrangement 10 in a fuel cell stack 34 in accordance with an exemplary embodiment as known from WO 2008/119328 A1. To simplify the following explanations, there are only shown three membrane electrode assemblies 52 and two interconnector arrangements. The fuel cell stack 34 however can comprise any number of membrane electrode assemblies 52 with interconnector arrangements 10 connecting them. In the depicted case the inventive interconnector arrangement 10 is arranged between two membrane electrode assemblies 52 which comprise each at least an anode 12, an electrolyte 14 as well as a cathode 16, respectively. In this, each membrane electrode assembly 52 and an interconnector arrangement 10 in contact with the anode 12 of the membrane electrode assembly 52 form a repetition unit of the fuel cell stack.

The interconnector arrangement 10 comprises an upper housing part 22 and a lower housing part 26. The upper housing part 22 is coupled to the electrolyte 14 of the membrane electrode assembly 52 arranged above an interconnector arrangement 10 via a glass ceramics seal 20. The lower housing part 26 on the other hand is coupled to the cathode 16 of a membrane electrode assembly 52 arranged below this interconnector arrangement 10 via several contact bars 30. In this there can be provided any number of contact bars 30. The lower housing part 26, the upper housing part 22 and the anode 12 form an intermediate space, in which a nickel foam 28 with wires 18 embedded therein is received. The wires are in particular ferritic chrome steel wires. In this, each wire 18 is received in a bulge of the lower housing part 26 and respectively is in contact with its bulge base. In addition, the wire 18 is in contact with the anode 12 of the upper membrane electrode assembly 52. There can be arranged any number of wires 18 in the bulges corresponding to the number of bulges in the lower housing part 26. At a bottom side of the lower housing part 26, i.e. between the lower housing part 26 and the lower membrane electrode assembly 52, there are respectively formed gas channels 32 by means of the bulges formed in the lower housing part 26, the contact bars 30 and the lower membrane electrode assembly 52. Preferably in this case a gas with high oxygen content or pure oxygen is guided through the gas channels 32, wherein on the other hand a gas with rich hydrogen content or pure hydrogen is guided through the nickel foam 28. In this each wire 18 is rolled such that just surface portions of the wire 18 which are rolled flat are in contact with the anode 12 of the upper membrane electrode assembly 52 and the lower housing part 26, in particular with the base of the bulges of the lower housing part 26. In this case the upper housing part 22 and the lower housing part 26 are connected to each other via a welding seam 24.

The anode 12, the glass ceramics seal 20, the upper housing part 22 (blind plate), the lower housing part 26 (flow field plate) and the wires 18 together define an anode flow field 60. The cathode 16, the contact bars 30 and the flow field plate 26 together define a cathode flow field 58 which comprises notably the channels 32. In operation of the fuel cell stack 34, the hydrogen-rich gas or, respectively, the pure hydrogen (fuel gas) flows through the anode flow field 60 while the oxygen-rich gas or, respectively, the pure oxygen flows through the cathode flow field 58.

The anode flow field 60 comprises a region 54 which does not project onto the anode 12 but onto the blind plate 22 (the projection is in the stack direction Z). Fuel gas flowing through the region 54 therefore cannot be absorbed by the anode 12. The region 54 thus forms an undesired gas bypass through which fuel gas can flow through the interconnector arrangement 10 without being used.

It is an object of the invention to further develop a generic interconnector arrangement and a generic fuel cell stack such that a gas bypass is avoided or at least reduced. This object is achieved by the characteristic features of the independent claims. Further developments and useful embodiments are set forth in the dependent claims.

The invention is distinguished from the generic prior art in that the interconnector arrangement comprises a hollow space which is separated from the anode flow field and from the cathode flow field such that a flow of gas through the hollow space may not be more than five percent of a flow of the gas through the cathode or anode flow field. A gas bypass may thus be avoided to a large extent. In accordance with particularly preferred embodiments the flow of the gas through the hollow space may not be more than two percent, better not more than one percent, of the flow of the gas through the cathode or anode flow field. An embodiment in which no gas may flow through the hollow space is optimal.

It may be provided that the hollow space may communicate neither with the anode flow field nor with the cathode flow field. A gas bypass through the hollow space may thus be avoided entirely. This may be achieved for example, depending on the embodiment, by welding the components defining the hollow space.

In accordance with a preferred embodiment the hollow space is elongate and extends parallel to a flow direction defined by the cathode or anode flow field. The hollow space may thus be adapted in a simple manner to the shape of the cathode or anode flow field, respectively.

It is possible that the hollow space is limited at least partially by a flow field plate separating the cathode flow field from the anode flow field.

In this context it may be provided that the flow field plate has an undulating, zigzag-shaped or meandering cross section and the hollow space is situated in a bulge of the flow field plate. Such a flow field plate is usually used to define channels for guiding gas alongside the anode and the cathode, respectively. The hollow space may thus be defined in a manner similar to the channels and extend essentially parallel to the channels to the extent to which the channels run parallel.

It may further be envisaged that the bulge is bridged by a blind plate. The blind plate may for example be welded to the flow field plate on two sides of the bulge, that is, connected by two welding seams.

It may be envisaged that the hollow space is situated in a border region of the interconnector arrangement. Alternatively the hollow chamber may also be situated in a central region of the interconnector arrangement. It is particularly preferred that the hollow space is situated within a region of the fuel cell stack respectively of the interconnector arrangement which is provided for transmitting a force acting in the stack direction.

It may further be advantageous that the hollow space is sealed at least partially by force closure. Alternatively, the hollow space may however be sealed completely by material closure.

The fuel cell stack according to the invention is distinguished from the generic prior art in that it comprises at least one interconnector arrangement according to the invention.

The method for manufacturing an interconnector arrangement according to the invention envisages that a first element which partially delimits the hollow space is welded with a second element which partially delimits the hollow space.

The invention will now be explained by way of example with reference to the accompanying drawings.

Figure 2:
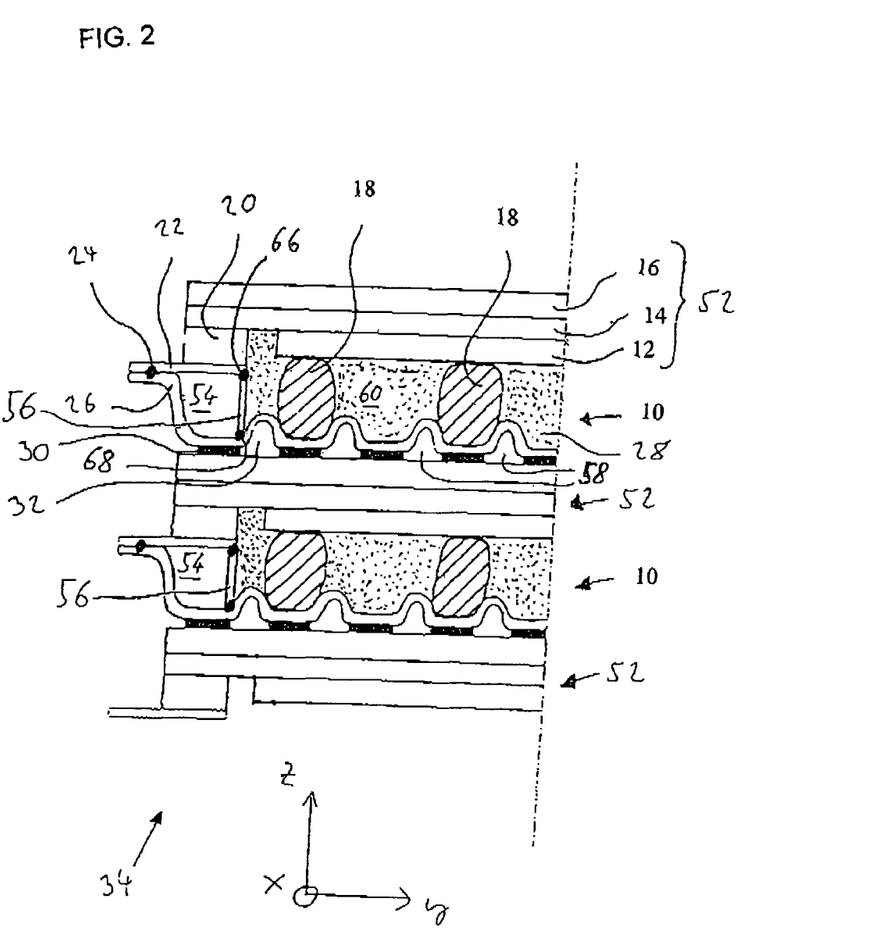
FIG. 2 shows a schematic cross section through a fuel cell stack according to the invention.

The fuel cell stack 34 schematically represented in FIG. 2 is distinguished from the fuel cell stack described in reference to FIG. 1 in that the region 54 is a hollow space which communicates neither with the anode flow field 60 nor with the cathode flow field 58. The hollow space 54 is delimited by the blind plate 22, the flow field plate 26, and by a sealing plate 56 linking the blind plate 22 to the flow field plate 26. The blind plate 56 is welded to the blind plate 22 along a welding seam 66. Furthermore, the sealing plate 56 is welded to the flow field plate 26 along a further welding seam 68. The hollow space 54 is thus separated in a gas-tight manner from both the anode flow field 60 and the cathode flow field 58. A flow of gas through the hollow space 54 is not possible. The hollow space 54 may for example be filled with air. The welding seams 24, 66 and 68 are closed in themselves. It is however also possible that the welding seam 66 has two ends tied respectively to the welding seam 24. In this case the welding seam 66 and the welding seam 24 together form a welding seam 24, 66 surrounding the hollow space 54.

In accordance with a related embodiment (not shown) at least the welding seam 66 is dispensed with. The elements 22, 66, 26 which delimit the hollow space 54 are then sealed against each other at their non-welded junctions by force closure. In this case it must be assumed that gas (typically fuel gas) from the anode flow field 60 diffuses into the hollow space 54. However, in this case, too, it may be achieved that a gas flow through the hollow space 54 is negligibly small as compared to the gas flow through the anode flow field 60.

Figure 3:
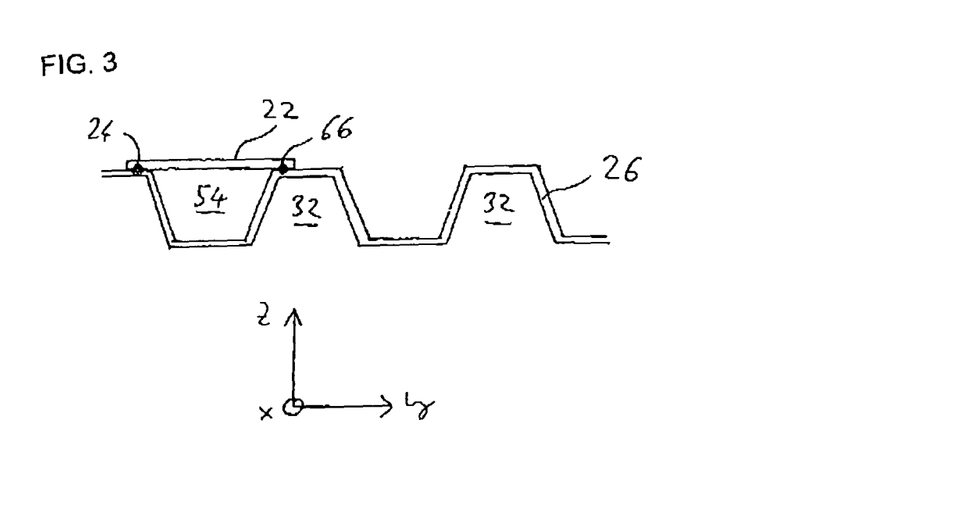
FIG. 3 shows a schematic cross section through a flow field plate and a blind plate connected to the flow field plate.

FIG. 3 schematically shows a cross section of a flow field plate 26 and of a blind plate 22 which are provided for use within an interconnector arrangement. The blind plate 22 is welded to the flow field plate 26 along two welding seams 24, 66. The blind plate 22 and the flow field plate 26 together define the hollow space 54 which is situated within a bulge of the flow field plate 26 having essentially a corrugated iron shape. In accordance with another embodiment the welding seam 66 is dispensed with; in this case the hollow space 54 may be sealed off for example by force closure.

Figure 4:
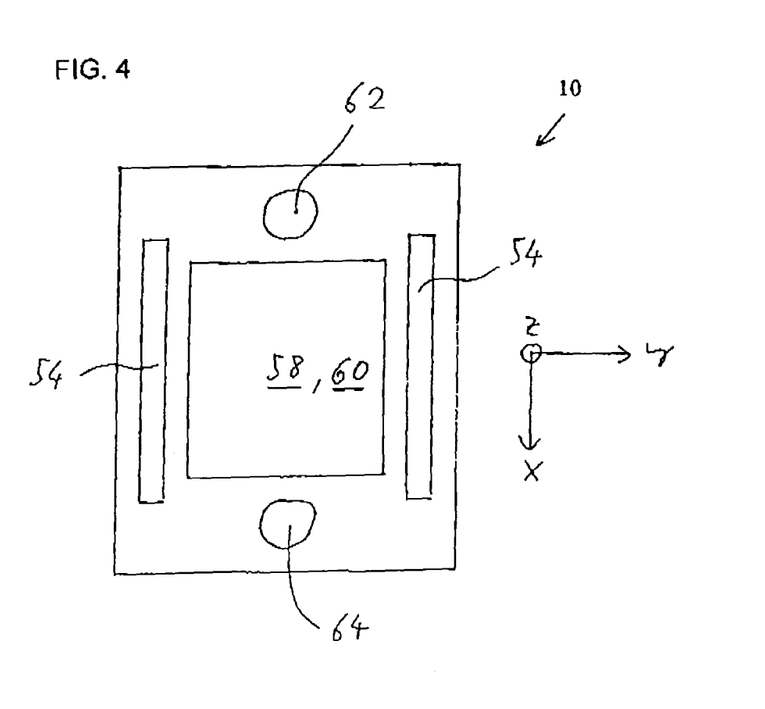
FIG. 4 shows a schematic top-view onto an interconnector arrangement.

FIG. 4 shows a schematic top-view onto an interconnector arrangement 10. On each of both sides of the cathode flow field 58 and, respectively, the anode flow field 60 an elongate hollow space 54 extends parallel to the cathode flow field 58 and to the anode flow field 60. A first manifold 62 and a second manifold 64 serve to transport fuel gas to and, respectively, from the anode flow field 60 not visible in the figure.

Figure 5:
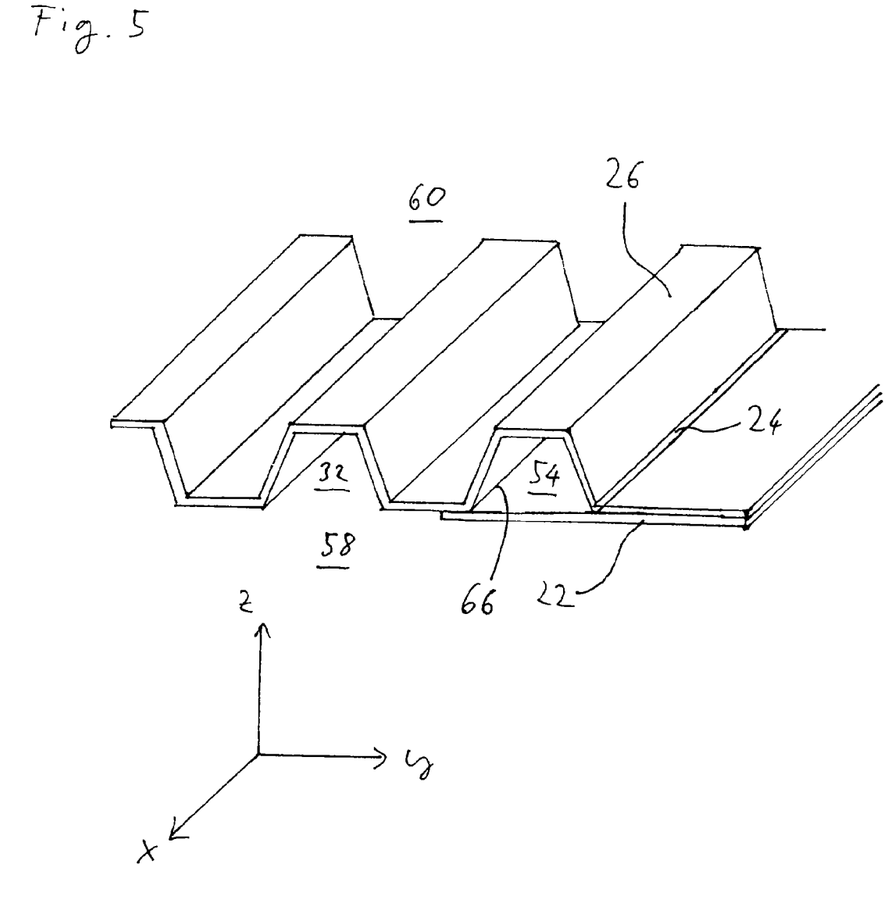
FIG. 5 shows a schematic perspective view of a flow field plate connected to a blind plate.

The arrangement of a flow field plate 26 and of a blind plate 22 represented perspectively in FIG. 5 differs from the embodiment shown in FIG. 3 merely in that the blind plate 22 is arranged beneath the flow field plate 62.

Figure 6:
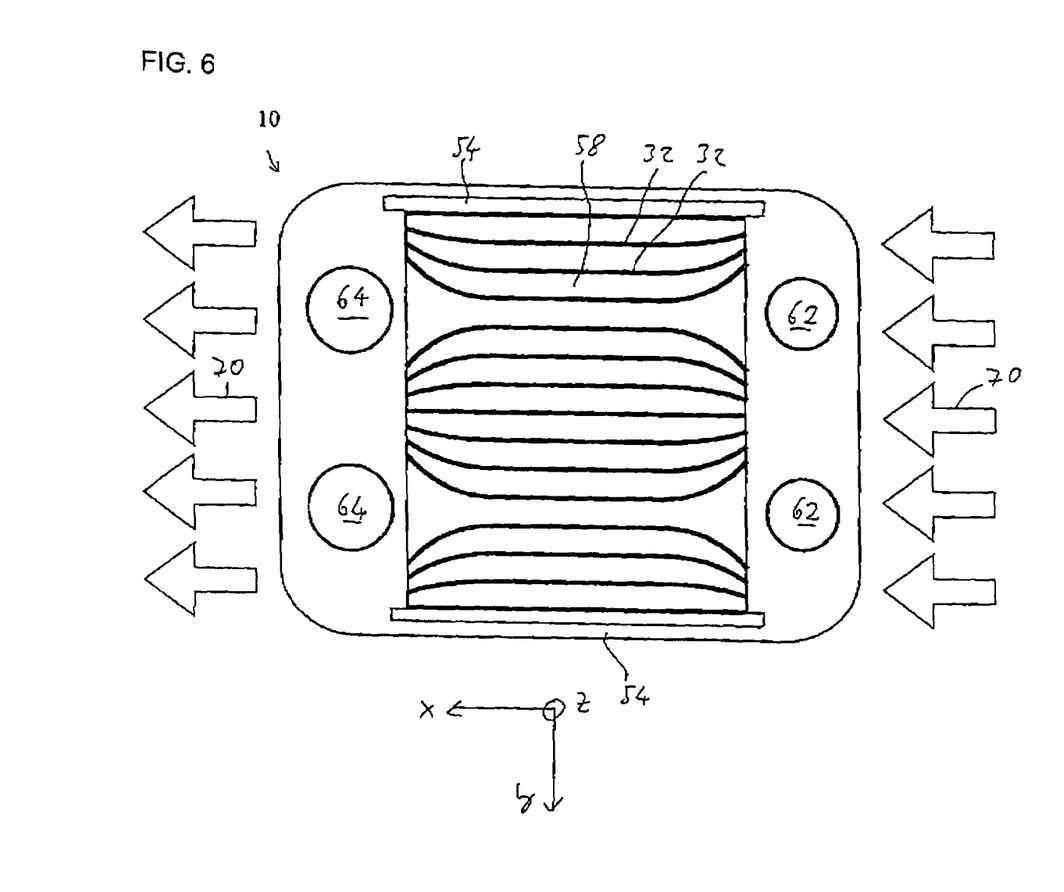
FIG. 6 shows a schematic top-view onto an interconnector arrangement.

FIG. 6 shows a top-view onto an interconnector arrangement 10 according to a further embodiment. Upstream and, respectively, downstream of the cathode flow field 58 there are situated perpendicularly (that is, in the Z-direction) to the flow direction of the oxygen-rich gas manifolds 62 and, respectively, manifolds 64 each of which forming a flow obstacle for the flowing oxygen-rich gas 70. In order to achieve an optimal distribution of the oxygen-rich gas 70 within the cathode flow field 58, the channels 32 of the cathode flow field 58 are not straight but curved in a streamlined manner, so as to convey the gas 70 also into the flow shadow of the manifolds 62 and, respectively, into the dynamic pressure zones in front of the manifolds 64. On each of both sides of the cathode flow field 58 an elongate hollow space 54 extends parallel to the flow direction of the oxygen-rich gas 70. The two hollow spaces 54 communicate neither with the cathode flow field 58 nor with an anode flow field that is not visible here.

Figure 7:
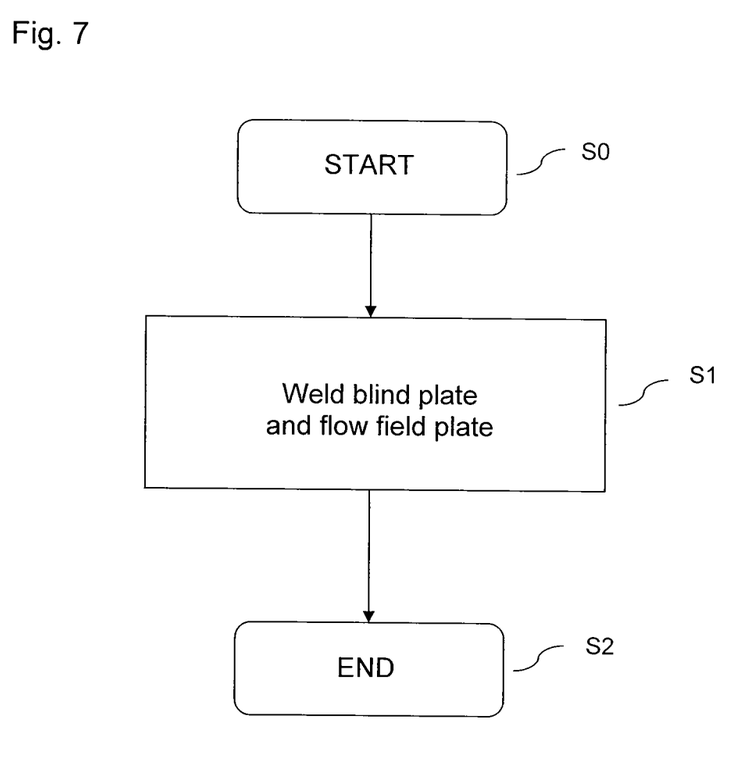
FIG. 7 shows a flowchart of a method for manufacturing an interconnector arrangement.

The flow chart in FIG. 7 illustrates a method for manufacturing an interconnector arrangement having a hollow space which communicates neither with a cathode flow field nor with an anode flow field. Firstly, a blind plate and a flow field plate are manufactured in a step not shown. In step S1 the blind plate and the flow field plate are arranged relative to each other so as to define together a hollow space. The hollow space may notably be elongate. The blind plate and the flow field plate are welded to each other along at least two seams.

The features of the invention disclosed in the above specification, in the figures and in the claims may be essential for the implementation of the invention individually as well as in any combination.

The invention claimed is:

1. An interconnector arrangement for a fuel cell stack, which can be brought into electrical contact with at least one membrane electrode assembly and which is arranged to separate a cathode flow field of the fuel cell stack from an anode flow field of the fuel cell stack, wherein the interconnector arrangement comprises
   a flow field plate separating the cathode flow field from the anode flow field, wherein the flow field plate has an undulating, zigzag-shaped or meandering cross section defining at least one bulge defining a hollow space not directly opposite an electrode,
   peripheral seals sealing the flow fields, and
   at least one internal seal separating the hollow space from the anode flow field and from the cathode flow field such that a flow of gas through the hollow space may not be more than five percent of a flow of gas through the cathode or anode flow field.

2. The interconnector arrangement of claim 1, wherein the hollow space cannot communicate with the anode flow field and the cathode flow field.

3. The interconnector arrangement of claim 1, wherein the hollow space is elongate and extends parallel to a flow-direction (x) defined by the cathode flow field or the anode flow field.

4. The interconnector arrangement of claim 1, wherein the bulge defining the hollow space is bridged by a blind plate as the seal so that the hollow space is enclosed between the flow field plate and blind plate.

5. The interconnector arrangement of claim 1, wherein the hollow space is situated in a border region of the interconnector arrangement.

6. The interconnector arrangement claim 1, wherein the hollow space is sealed off at least partially by force closure.

7. A fuel cell stack comprising art interconnector arrangement of claim 1.

8. An interconnector arrangement for a fuel cell stack, wherein the fuel cell stack comprises
   a first fuel cell comprising a membrane electrode assembly (52) having at least a cathode (16), an anode (12), an electrolyte (14) between the cathode and anode, an anode flow field (60) on the side of the anode opposite the electrolyte, a cathode flow field (58) on the side of the anode opposite the electrolyte,
   a second fuel cell comprising at membrane electrode assembly (52) having at least a cathode (16), an anode (12), an electrolyte (14) between the cathode and anode, an anode flow field (60) on the side of the anode opposite the electrolyte, a cathode flow field (58) on the side of the anode opposite the electrolyte,
   wherein peripheral seals (20, 30) are provided for sealing the periphery of the flow fields,
   wherein the anode flow field of the first fuel cell is adjacent the cathode fuel field of the second fuel cell and said flow fields are separated by a flow field plate (26) having an undulating, zigzag-shaped or meandering cross section forming bulges in the flow fields, wherein the flow field plate includes at least one bulge which is not directly facing an electrode, the bulge thus defining a hollow space (54) which functionally does not supply gas to the electrode, and an internal gas seal (56) between the flow field and the hollow space (54).

9. The interconnector arrangement of claim 8, wherein the bulge defining the hollow space is bridged by a blind plate as the seal so that the hollow space is enclosed between the flow field plate and blind plate.

10. An interconnector arrangement for a fuel cell stack, wherein the fuel cell stack comprises a first fuel cell comprising a membrane electrode assembly (52) having at least a cathode (16), an anode (12), an electrolyte (14) between the cathode and anode, an anode flow field (60) on the side of the anode opposite the electrolyte, a cathode flow field (58) on the side of the anode opposite the electrolyte, a second fuel cell comprising at membrane electrode assembly (52) having at least a cathode (16), an anode (12), an electrolyte (14) between the cathode and anode, an anode flow field (60) on the side of the anode opposite the electrolyte, a cathode flow field (58) on the side of the anode opposite the electrolyte, wherein the anode flow field of the first fuel cell is adjacent the cathode fuel field of the second fuel cell and said flow fields are separated by a flow field plate (26) having an undulating, zigzag-shaped or meandering cross section forming bulges in the flow fields, wherein a peripheral seal (20) is provided for sealing the periphery of the anode flow field, wherein the flow field plate (26) defines at least one bulge in the anode side of the plate which is not directly facing the anode (12), the bulge thus defining a hollow space (54) outside the region in which flow of fuel gas supplies hydrogen to the electrode, and an internal gas seal (56) sealing said hollow space (54) blocking at least 95% of said fuel gas from entering into and flowing through said hollow space (54).

11. The interconnector arrangement of claim 10, wherein the bulge defining the hollow space is bridged by a blind plate as the seal so that the hollow space is enclosed between the flow field plate and blind plate.

* * * * *